United States Patent [19]

Burrows et al.

[11] 4,392,208
[45] Jul. 5, 1983

[54] DATA PROCESSING SYSTEM AND DIAGNOSTIC UNIT

[75] Inventors: James E. Burrows, Stoke on Trent; Ivan R. Greenaway, Brierley Hill, both of England

[73] Assignee: International Computers Limited, London, England

[21] Appl. No.: 244,864

[22] Filed: Mar. 18, 1981

[30] Foreign Application Priority Data

Mar. 19, 1980 [GB] United Kingdom ............... 8009306

[51] Int. Cl.³ .................... G06F 9/06; G06F 11/04
[52] U.S. Cl. .................................................. 364/900
[58] Field of Search ... 364/200 MS File, 900 MS File; 371/18, 21, 16

[56] References Cited

U.S. PATENT DOCUMENTS

| | | | |
|---|---|---|---|
| 3,999,053 | 12/1976 | Dalmasso | 364/200 |
| 4,167,779 | 9/1979 | Sullivan et al. | 364/200 |
| 4,212,059 | 7/1980 | Sato et al. | 371/18 |
| 4,315,311 | 2/1982 | Causse et al. | 371/18 |

Primary Examiner—Gareth D. Shaw
Assistant Examiner—Daniel K. Dorsey
Attorney, Agent, or Firm—Lee, Smith & Jager

[57] ABSTRACT

Data processing system having a main processor system and a diagnostic unit. The main processor system may transmit messages selected by itself to the diagnostic unit. It does so by writing information to a predetermined location in a writable microprogram control store. The diagnostic unit loads the address of that location into a reference address register and sets an address comparison circuit to respond only to write accesses. The address comparison circuit then outputs a signal on a line when it detects equivalence between that address and the address used in the control store access, held in an address input register. The output signal acts as an interrupt signal for a microprocessor system which subsequently causes a halt circuit to halt execution of microinstructions in the main processor. It then causes a control circuit 76 to carry out a read access of the control store at the predetermined address, held in an address output register. The data output is received in a data output register.

7 Claims, 5 Drawing Figures

DATA PROCESSING SYSTEM AND DIAGNOSTIC UNIT

BACKGROUND OF THE INVENTION

This invention relates to data processing systems, and in particular to data processing systems that include diagnostic apparatus. The purpose of diagnostic apparatus is to monitor the operation of the data processing system, checking that it is functioning correctly, and, if it is not, providing information about the nature of the fault.

In carrying out this function the diagnostic apparatus is usually connected to receive signals indicating the current state of parts of the data processing system.

This state may be monitored to ensure that it is correct. In addition it has been proposed to make the diagnostic apparatus capable of pre-empting control of the data processing system to cause it to carry out some operations determined by the diagnostic apparatus. The course or results of these operations is then monitored.

SUMMARY OF THE INVENTION

This invention provides a data processing system comprising a main processor system and diagnostic apparatus, the main processor system including a central processor having a writable control store for a microprogram for controlling the operation of the central processor and the diagnostic apparatus being capable of monitoring and controlling operations of the central processor, and the arrangement being such that in operation the central processor passes data selected by itself to the diagnostic apparatus by writing the data into a predetermined location of the control store, the diagnostic apparatus detecting the carrying out of a write operation to that location and thereafter causing the information written to that location to be read out and transferred to itself.

The information transferred to the diagnostic apparatus is therefore not limited to indications of what is happening in the data processing system, but can include messages selected by the data processing system. Besides error messages in the case of faulty operation it can communicate information about its correct functioning, for example to announce the stage it has reached in carrying out a sequence of operations. The invention allows the transfer to be carried out with considerable economy of resources.

BRIEF DESCRIPTION OF THE DRAWINGS

A system in accordance with the invention will now be described in greater detail by way of example with reference to the accompanying drawings, in which.

DESCRIPTION OF THE PREFERRED EMBODIMENT

Overall System

Figure 1:
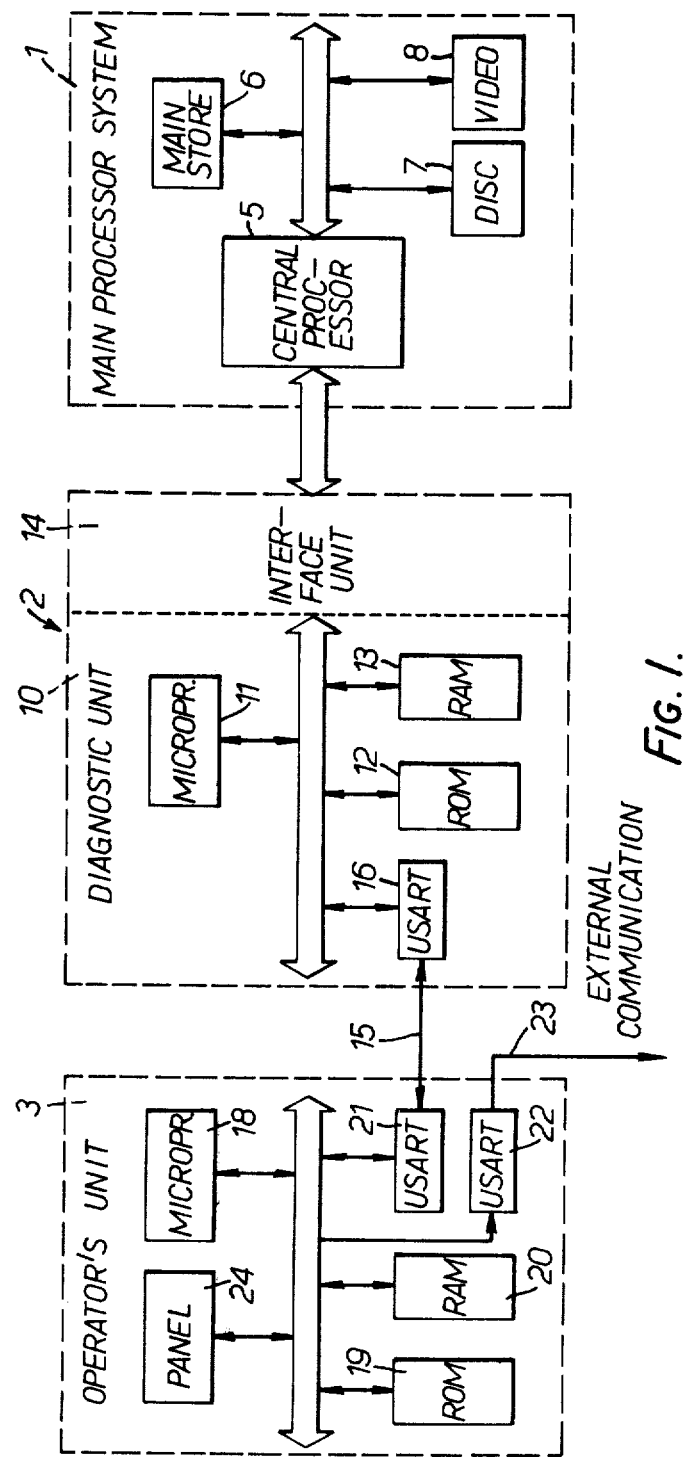
FIG. 1 is a block diagram of the overall system.

Referring to FIG. 1, the overall data processing system consists of a main processor system 1, to which is coupled a diagnostic unit 2 under the control of an operator's unit 3.

The main system 1 has a central processor 5, a main store 6 and various peripherals, of which a disc store 7 and a video console 8 are shown. In normal operation it executes programs held in the main store 6 and is controlled by the operator using the video console 8.

The diagnostic unit 2 and operator's unit 3 are used in monitoring and testing the main processor unit to check that it is functioning correctly, in determining the cause of the faults that may occur, and in bringing the overall system into operation, for example at the start of the day, in a controlled fashion. The diagnostic unit 2 contains a microprocessor system 10. This system includes a microprocessor 11 controlled by firmware in a read-only memory (ROM) 12 and uses a random-access memory (RAM) 13 for working storage. The microprocessor system 10 is coupled to the central processor 5 of the main system through an interface unit 14, which is capable of monitoring and controlling the state of various components of the central processor 5. The actions centrally carried out are specified by routines held in the ROM 12.

The diagnostic unit 2 communicates with the operator's unit 3 over a standard bit-serial link 15 to which it is connected through a universal synchronous/asynchronous receiver/transmitter (USART) 16.

Operator's Unit

The operator's unit 3 also includes a microprocessor system. It has a microprocessor 18 controlled by firmware held in a ROM 19 and uses a RAM 20 for working storage. The link 15 is connected to a USART 21, and there is an optional second USART 22 connected to an external communications link 23 to permit remote diagnosis or control of the overall system.

The operator's unit 3 also includes an operator's panel 24 which allows information to be input to and output from the unit. The panel 24 has indicators showing the state of the system, such as that the central processor 5 is executing a program, or types of fault, such as a parity error; a multi-digit display; a keypad; and function keys such as "load" or "dump."

The operator's unit 3 sends commands and data over the link 15 to the diagnostic unit 2. The commands call routines in the ROM 12 to control the operation of the diagnostic unit and the data may be passed on to the main system 1. In the reverse direction, data, which may be from the main system 1 or the diagnostic unit, is sent over the link 15 to the operator's unit 3, where it may be displayed on the operator's panel 24.

Main Processor

Figure 2:
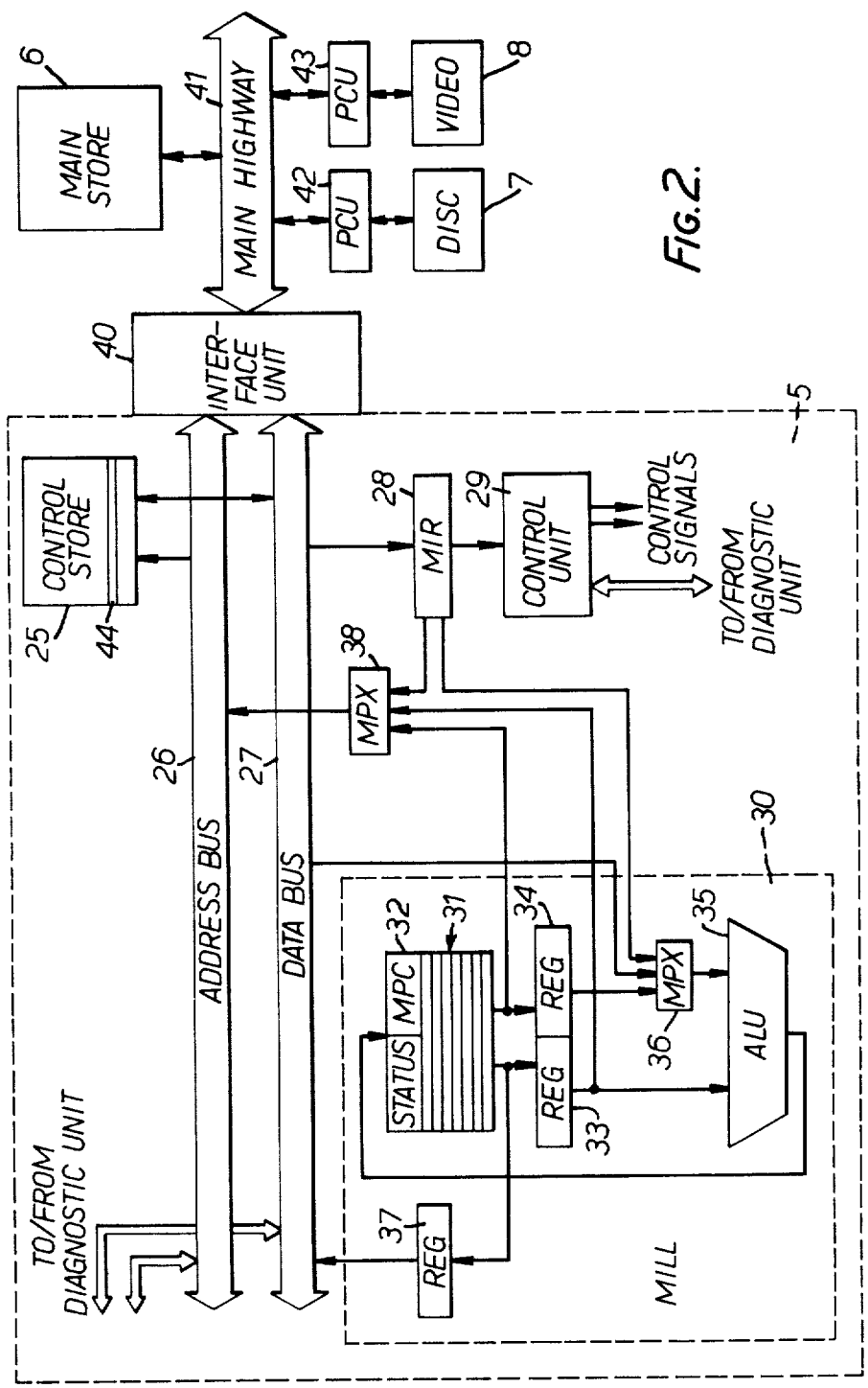
FIG. 2 is a block diagram of the main processor system.

The central processor 5 is microprogrammed. That is, the control signals that govern its operation are derived by decoding microinstructions contained in a control store. Referring to FIG. 2, the control store, denoted by the reference numeral 25, is writable and is connected to an address bus 26 and a data bus 27. Its output passes via the data bus 27 to a microinstruction register 28, where it is decoded by a control unit 29 which outputs the control signals for the various parts of the central processor 5 in the appropriate sequence.

All data manipulations, including those involved in calculating control store addresses, take place in a mill 30. The mill contains a file of registers 31, most of which are general purpose, but one of which, a register 32, holds status information and the microprogram counter.

The contents of any of these registers may be supplied through either of two outlets, one leading to a register 33 and the other to a register 34. These bus registers are source registers for an arithmetic and logic unit (ALU) 35, which carries out the usual manipulations and generates condition signals indicating, for example, the sign of an arithmetic operation. The registers 33 and 34 are also connected end-to-end as a single recirculating shift register for carrying out shifting of a required number of places. The output of the ALU 35 is returned to a selected register in the file 31.

Data is input to the mill 30 from either the data bus 27 or the microinstruction register 28. It passes directly to the ALU 35 via a multiplexer 36 in the path from the register 34. Data may be output from the mill 30 to the data bus 27 from a register 37, which receives the output of the register file 31 that also passes to the register 33. In addition data may be output to the address bus 26 either from the input to the register 34 or from the output from the register 33. Either of these sources, or the microinstruction register 28, may be selected by a multiplexer 38.

The data and address buses 26 and 27 communicate with an interface unit 40 for a main highway 41 to which are attached the main store 6 and peripheral control units such as units 42 and 43 for the disc store 7 and video console 8.

Data to be transferred from the central processor 5 to the other devices is supplied with its destination address to the interface unit 40 and the transfer then takes place autonomously. If the central processor 5 requests a read operation on the main store 6 or a peripheral the request is passed to the interface unit 40, which notifies the central processor when the request is fulfilled and it holds the information which is to be transferred into the central processor 5. It will also notify the central processor 5 by sending an interrupt when it receives information from an input peripheral.

The operation of the main processor system 1 will now be described, in brief detail only, since much of it is not relevant to this invention. The program to be executed by the system 1 is held in the main store 6. In the known manner the instructions in this program and the associated operand 3 are retrieved by the central processor 5 and the instructions executed.

The operation of the central processor 5 is governed by control signals derived from the microinstructions held in the control store 25. The normal sequence of events starts with a microinstruction fetch. The value held in the microprogram counter in the register 32 is used to address the control store, and the micro-instruction read out is introduced into the microinstruction register 28, where it is decoded by the control unit 29 to control the execution of the microinstruction. That generally takes place in two stages, defined by two fields in the microinstruction. The first passes two operands, obtained from specified registers in the file 31 or the microinstruction register 28, through the ALU 35, where they are transformed in a manner specified by the microinstruction. The second transfers data between the registers 31, the control store 25 and the interface unit 40. Addresses for control store accesses may be supplied by the microinstruction, a register 31 specified by the microinstruction, or the interface unit 40.

While the microinstruction fetch is taking place the microprogram counter in the register 32 is incremented by one, and that value is normally used for the next instruction fetch. However, a conditional or unconditional branch microinstruction causes it to be modified.

When the data read from the main store 6 is an instruction in the main program, its operation code will be analysed by a microprogram sequence to set the microprogram counter in the register 32 to the appropriate value pointing to the start of a microprogram sequence which executes that particular instruction.

Interrupts are produced by the interface unit 40 for hardware faults and for requests to input information from input-output devices. They are tested for immediately after each microinstruction fetch and lead to the contents of the register 32, defining the current state of the central processor 5, being stored in the control store 5 and replaced by a value depending on the cause of the interrupt.

A location 44 in the control store is used for a purpose that will be explained subsequently.

The design of the central processor 5 makes it especially suitable for emulation, and the program in the main store 6 may therefore be written in the machine code of an already existing computer.

Diagnostic Unit

Figure 3:
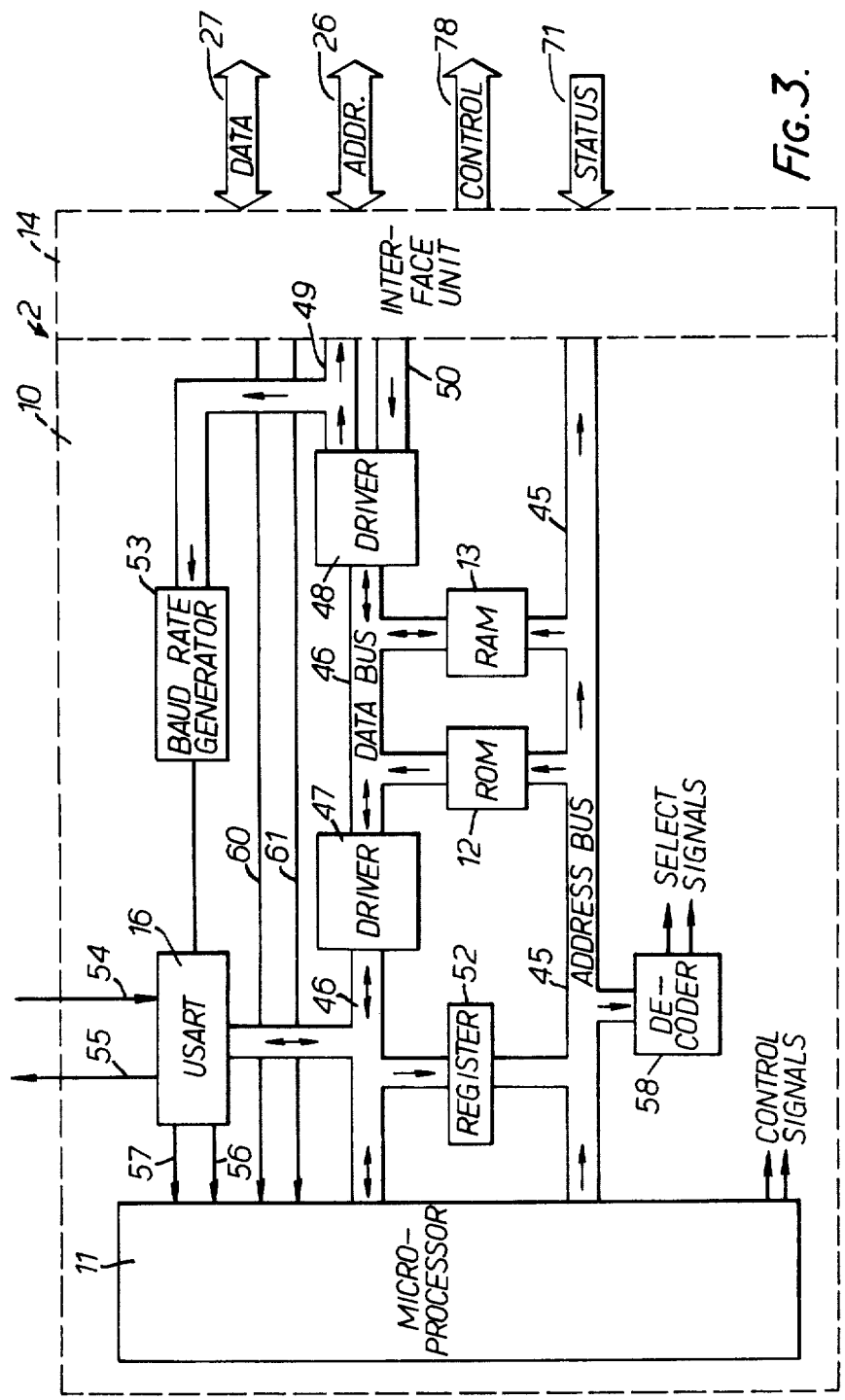
FIG. 3 is a block diagram of the diagnostic unit.

Referring to FIG. 3, the microprocessor system 10 of the diagnostic unit has an address bus 45 and a data bus 46. The address bus 45 supplies addresses to the ROM 12 and RAM 13, and data is output from them to (and also input to the RAM 13 from) the data bus 46, which is bidirectional and has two tri-state bus drivers 47 and 48. The data bus 46 communicates with the microprocessor 11. It also communicates, after having been split into two unidirectional buses, an outgoing bus 49 and an incoming bus 50, with the diagnostic interface unit 14. The address bus 45 receives high order address bits directly from the microprocessor 11 and low order address bits from the data bus 46. The low order data bits are latched in a register 52 while a transfer takes place in order to free the data bus 46 for data.

The USART 16 receives data from the data bus 46 and clock signals from a baud-rate generator 53 which is set by data from the bus 49. The USART 16 has an incoming line 54 and an outgoing line 55, which together form the link 15 of FIG. 1. The USART 16 outputs two interrupt signals to the microprocessor, one on a line 56 which indicates that a character has been received by the USART 16 and the other, of lower priority and on a line 57, which indicates that the USART is ready to receive a character for transmission.

The microprocessor 11 uses a single address space for all the locations in the various devices to or from which it can transfer data; that is, they are memory mapped. A decoder 58 decodes the highest order address bits to supply an enable signal to the selected device, and also to the buffer 47 to enable data flow in the required direction.

The microprocessor 11 also outputs control signals to the various devices, for example to determine whether a transfer is to be a read or a write.

The microprocessor system 10 is coupled to the main processor system 1 through the diagnostic interface unit 14, which is connected to the data buses 49 and 50 and the address bus 45. It also receives control signals from the decoder 58. It returns interrupt signals to the microprocessor 11 on a pair of lines 60 and 61.

Diagnostic Interface Unit

Figure 4:
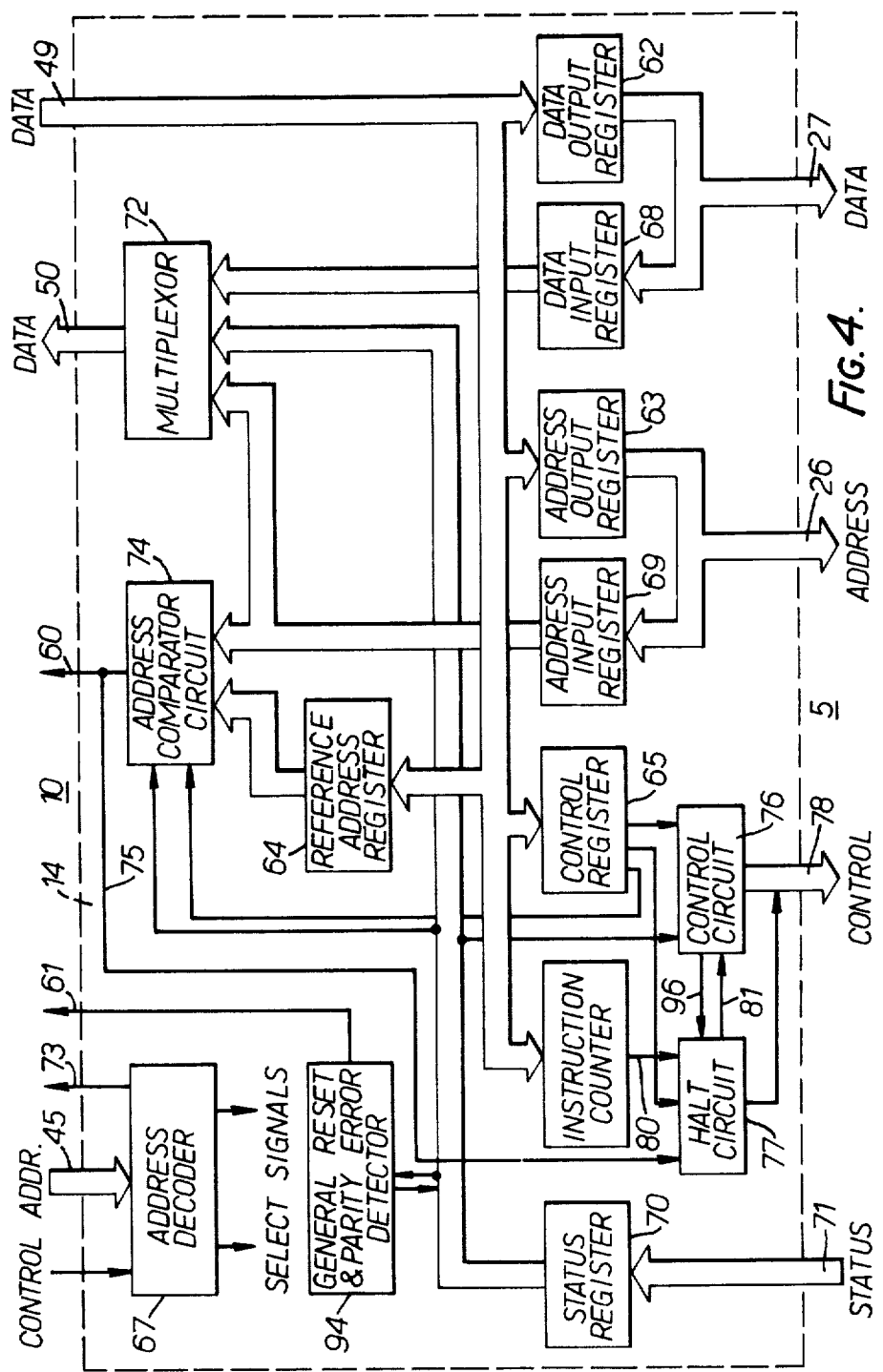
FIG. 4 is a block diagram of the diagnostic interface unit.

Referring to FIG. 4, the diagnostic interface unit 14 buffers data to be passed between the diagnostic processor system 10 and the central processor 5, and also carries out some logic operations on this data.

The interface unit 14 has various registers which may be loaded with data from the data bus 49 of the diagnostic processor system 10. These registers are a data output register 62, an address output register 63, a reference address register 65 and an instruction counter 66. They too are memory-mapped, that is, allotted addresses in the address space of the microprocessor 11, and the microprocessor 11 causes the appropriate one to be loaded by sending a write control signal and placing its address on the address bus 45. The write signal and address are received by an address decoding circuit 67 which enables the appropriate register so that it is loaded from the data bus 49. As some of these registers are wider than the data bus loading a complete register may in fact take place in stages with this operation being repeated.

These registers are seen as write-only by the microprocessor 11, but their addresses are duplicated in the RAM 13, which therefore holds an image of their contents for retrieval by the microprocessor 11.

Data from the central processor 5 is buffered in the interface unit 14 in three registers, a data input register 68 which can receive data put onto the data bus 27 of the central processor 5, an address input register 69 which can receive the address put onto the address bus of the central processor 5, and a status register 70 which buffers the state of a set of status lines 71 from the central processor 5. These registers too, are memory-mapped and the microprocessor 11 may read any of them by sending the appropriate address and a read signal to the address decoder 67, which enables a multiplexor 72 to pass the selected data to the data bus 50. At the same time the address decoder 67 sends a control signal on a line 73 to the tristate buffer 48 to enable data flow in the direction of the microprocessor 11. Again, the read may take place in several stages.

The contents of the reference address register 64 and address input register 69 are compared by an address comparator circuit 74 which, when it detects equivalence, outputs a signal on a line 75 and another signal on the line 60 which interrupts the microporcessor 11.

The microprocessor 11 controls many activities of the interface unit 14 by writing data into the control register 65. Each bit of this register is assigned a particular significance and is applied to conventional digital logic in two circuits, a control circuit 76 and a halt circuit 77.

The control circuit 76, which also receives status information concerning the central processor 5 from the status register 70, has two main functions, to control the operation of various elements of the interface unit 14 and to supply control signals on lines 78 to the central processor 5. The first function includes issuing signals to control the output of data from the address output register 63 to the address bus 26 or the data output register 62 to the data bus 27, or the input of data from these buses to the address input register 69 or the data input register 68 respectively.

The halt circuit 77 receives, besides signals from the control register 65, a signal from the instruction counter 66 on a line 80, the signal from the address comparator 74 on the line 75, and a signal from the control circuit 76 on a line 96. It outputs a signal on a line 81 which is tested by the central processor 5 before each microinstruction fetch, and while set prevents the fetch taking place, thus halting execution of the microinstruction.

Figure 5:
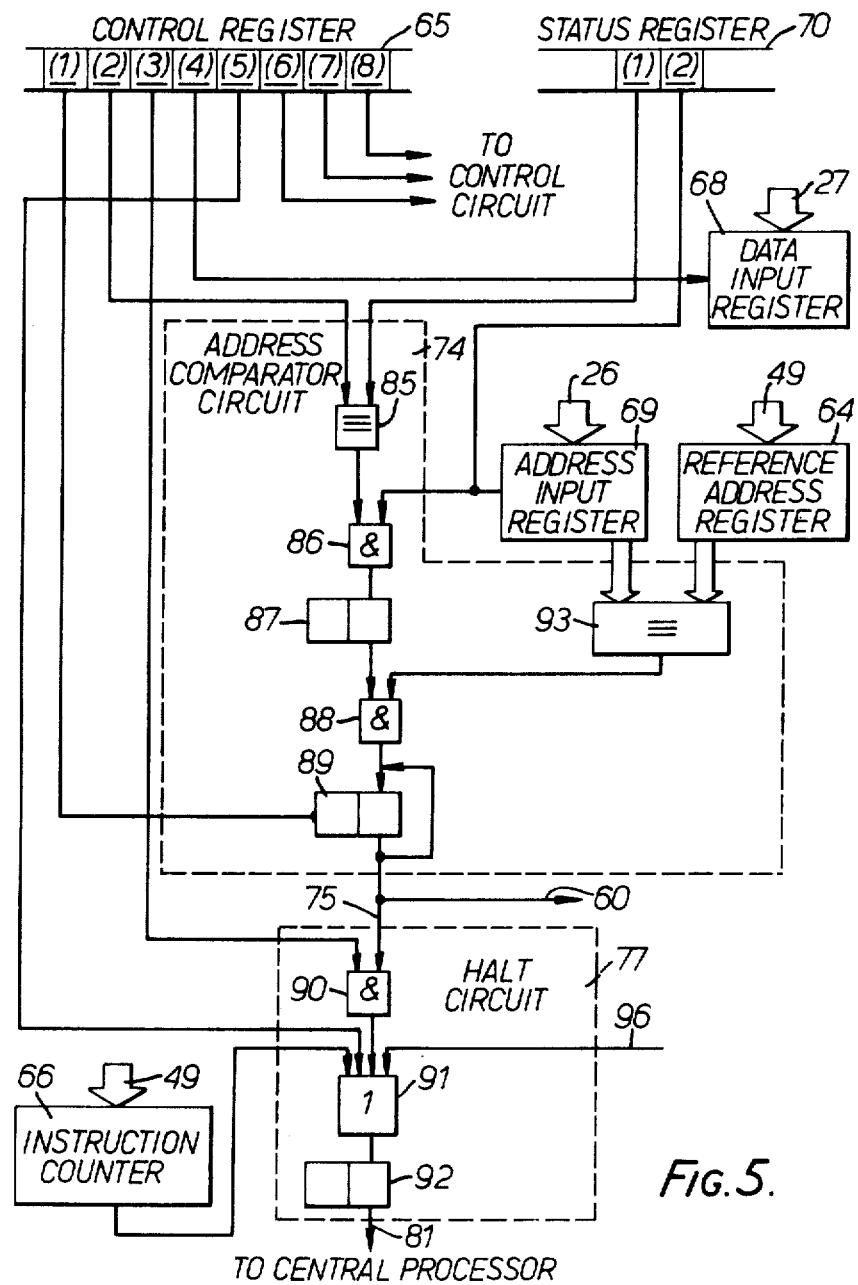
FIG. 5 is a logic diagram of parts of the diagnostic interface unit.

The halt circuit 77 and the address comparator circuit 74 will now be described in greater detail with reference to FIG. 5.

The function of the address comparator circuit 74 is to detect equivalence between the address set in the reference address register 69 and the address used in an access to the control store 25. In performing this function it uses two bit positions of the control register 65. A bit 65(1) is set to enable comparison and a bit 65(2) is set to indicate whether the access to be detected is to be a read or write. The halt circuit 77 uses a bit 65(3) which is set to indicate that when equivalence of the desired type is detected the central processor 5 is to be halted.

The state of the bit 65 (2) is output to the address comparator circuit 74, where it passes to a comparator element 85, which also receives the output of a bit 70(1) of the status register 70. This bit is set by one of the status lines 71 to indicate whether the control circuit 29 of the central processor 5 is set for a read or write. The comparator circuit 74 therefore produces an output when the transfer is set to be of the required type. This output is gated at an AND gate 86 with the output of another bit 70(2) in the status register 70, which is strobed during each access to the control store 25. This output is also used to permit the contents of the address bus 26 to be clocked into the address input register 69, which thus holds the address of the current control store access.

The output of the gate 86 is buffered in a bistable 87 whose output is gated by an AND gate 88 with that of a comparator element 93. The output of the AND gate 88 therefore indicates that address equivalence has occurred in an access of the required type. Provided bit 65(1) has been set to enable comparison, the output of the gate 88 is latched and sustained by a bistable 89. This element outputs a signal on the line 60, which is the second highest priority interrupt line to the microprocessor 11, informing the microprocessor 11 that equivalence of the required type has been detected.

The signal from the bistable 89 also passes on the line 75 to the halt circuit 77, where it is gated in an AND gate 90 with the output of the bit 65(3), which when set in dicates that the central processor 5 is to be halted when equivalence is detected—for example on an attempt to read a specified location in the control store, that is execute a particular microinstruction. The output of the gate 90 passes through an OR gate 91 to a latch 92, which provides the halt signal to the central processor 5 on the line 81. The OR gate 91 can also receive a signal from the instruction counter 66 on the line 80 and which also causes the halt signal to be output.

A bit 65(4) is set in the control register 65 when the microprocessor wishes the data on the data bus 27 to be introduced into the data input register 68. The state of this bit is passed directly by the control circuit 76 to the data input register 68 so that when set it enables the desired transfer.

The instruction counter 66 may be loaded with a count by the microprocessor 11. It receives a countdown signal from a status line for each instruction fetch to the control store 25, and when it reaches zero outputs a signal on the line 80 which causes the halt signal to be sent to the central processor on the line 81. In this way the central processor can be caused to halt when it has executed a predetermined number of microinstructions.

An additional input to the OR gate 91 directly from a control-register bit 65(5) allows the microprocessor system 10 to impose a halt on the central processor 5.

A general reset and parity error detector 94 responds to status lines indicating that a general reset of the main system 1 has been caused (for example by failure to service a built-in watchdog tuner), or that a fault such as a control store parity error has occurred. When it detects either of these events it informs the microprocessor 11 by outputting a signal on the interrupt line 61, which has the highest priority. When it detects a fault it holds information concerning the nature of the fault to be supplied to the microprocessor system 10 through the multiplexor 72, and also inhibits the clocking of the address input register 69 so that the address of the current control store location when the fault occurs is saved to help locate it.

The control signals 78 to the central processor 5 include signals which cause an access to take place to a memory resource of the central processor 5 by cycle stealing. Thus a bit 65(6) may be set to indicate that the access is to the control store and cleared if the access is to the register file, a bit 65(7) set to indicate a write and cleared to indicate a read, and a bit 65(8) set to initiate action of the control circuit 76. The control circuit 76 contains logic elements which then first issue a signal on the line 96 to cause the halt circuit 77 to set the halt line 81 and then, when enabled by a response on one of the status lines 71 indicating that the processor has halted, provide the control signals which cause the access to occur. when the access is completed the halt request is cleared. Additional signals (not shown) allow the microinstruction register to be loaded.

The diagnostic interface unit 14 and the central processor 5 may be implemented in a fast form of logic such as ECL. The microprocessor system 10 may be implemented in a slower form such as TTL. Level-changers (not shown) are then provided in the lines from the interface unit 14 to the microprocessor system 10 to convert the levels of the signals as they pass from one form of logic to the other.

Operation Of The Overall System

The diagnostic unit 2 monitors and controls the operation of the main processor system 1 in two modes. In the first, a single-step mode, it stops the clock of the central processor 5 and then issues its own clock signals on a control line 78 to cause the central processor 5 to carry out one or more cycles. In this mode memory resources in the central processor 5 may be written to or read from, allowing a very flexible and comprehensive examination of the operation of the system.

In the second mode the diagnostic unit 2 monitors the main system 1 while it is running at normal speed. In this case a general reset or a parity error or other hardware fault detected by the main system 1 causes an interrupt to the microprocessor as explained. In addition, the instruction counter 66 may be loaded and enabled, so that the central processor 5 is halted when the required number of microinstructions have been executed. The address comparison circuit allows the diagnostic system to detect when a read or write, as desired, is made to a specified location in the control store 5, and also for the central processor 5 then to be halted if desired, depending on the settings of the bits 65(1) to 65(3).

The diagnostic processor 10 is controlled by the firmware in the ROM 12, which in turn is interrupt-driven from the operator's unit 3 or the interface unit 14. The operator's panel may send commands or data. Commands cause specified activities to take place in the interface unit 14 and USART 16, or control the operation of the firmware. Data may be supplied asynchronously or synchronously. In the first case it is supplied in character form and loaded into a data buffer in the RAM 13, from where it may be moved to an address buffer in the RAM 13 by another command. These values can then be transferred to the interface unit 14 by further commands. Thus by loading the control and other registers of the interface unit 14 it can be caused to manipulate the central processor 5 in the desired way. Alternatively, the USART can be reset by a command to synchronous mode, in which case binary information is transferred from the operator's unit 3 straight to the control store 25, where it is loaded sequentially starting from a specified address.

The diagnostic unit 2 normally returns a "complete" or "fail" message when a command causes it to carry out an activity like issuing a control signal to the central processor 5. It can also return data, for example, in reply to a command to read the input registers in the interface unit 14 from the central processor 5.

The diagnostic unit 2 maintains a diagnostic status word in the RAM 13 which holds information about the activity being carried out and any faults experienced. Interrupts from the diagnostic interface unit 14 cause entries in this word. Thus the interrupt on the line 60 causes a bit to be set indicating that address equivalence of the specified type has been detected.

Because the diagnostic unit 2 passes information to the operator's unit 3 purely on a master-and-slave basis with the operator's unit as the master, the diagnostic unit cannot volunteer information about interrupts to the operator's unit. The operator's unit therefore issues a poll command at regular intervals, for instance once a second, and receives the diagnostic status word in return. It may then seek further information concerning any interrupt or fault recorded in the status word.

The diagnostic unit may be used at any time to check the operation of the main processor system 1. However, one very important time is when the system is brought into operation, for example at the start of the day, because this is a time at which any faults are particularly likely to show themselves. When the overall system is switched on the operator's unit 3 and diagnostic unit 2 test themselves and the link between them, and if successful display the fact on the operator's panel 24. At this point the control store 25 and main store 6 are clear and the microprogram it is to contain is held in a storage peripheral such as the disc 8. The operator then presses a load key, enters parameters from the keyboard concerning the device from which the microprogram is to be loaded and presses an enter key. That causes the operator's unit 3 to transmit binary data held in the ROM 19 to the diagnostic unit 2, from where it is loaded into the control store 25. The diagnostic unit 2 then reads the store information back and checks that it has been entered correctly. If so the first five instructions in the control store 25 are run in single-step mode. They check the incrementing and branching operation of the microprogram counter in the register 32. If successful these steps are repeated by the central processor 5 running at normal speed. The microprogram continues progressively to test the facilities of the main system, until it is able to use the parameters input to the operator's unit 3 to load a second-level bootstrap program from the selected peripheral, first into the main store 6, and then into the control store 25. This program, which is device-dependent, having carried out further checks, loads the actual microprogram into the control store via the main store. The system is then ready to start loading programs into the main store 6.

In accordance with this invention, information selected by the main system may be transferred to the diagnostic unit 2 and operator's unit 3 under the control of the main system. A location in the control store 25, shown in FIG. 2 as the location 44, is allotted to communication from the central processor to the diagnostic and operator's units. The address of this location is loaded into the reference address register 64 from the data buffer in the RAM 13 and the bits 65(1), (2) and (3) are set to cause a signal to be output on the line 60 when address equivalence is detected on a write to the control store 25, but not to halt the central processor 5, that is, not to output the halt signal on the line 81. When next the operator's unit 3 polls the diagnostic unit it checks the appropriate bit in the diagnostic status word and learns that equivalence of the desired type has been detected. It then causes the contents of location 44 written to in the control store 25 to be read into the diagnostic unit 2 and from there to the operator's unit where it may be displayed.

In more detail the last step takes place by setting the bits 65(6) and 65(7) to indicate that a read is desired to the control store, putting the address of location 44 into the address output register 63 from the data buffer in the RAM 13, and setting bit 65(8) to initiate the control circuit 76 to perform the access. The data retrieved is held in the data input register 68. From there it is transferred to the operator's unit 3.

This mechanism allows the central processor 5 to send messages to the operator's unit. It is used in the initial loading sequence to keep the operator informed of the progress of the sequence. The sequence is divided into stages and, with the address comparator circuit 74 enabled and holding the address of the output location 44, the central processor 5 sends a message at the start of each stage identifying the stage and the fact that it has been started. This message is displayed by the operator's panel 24 and also recorded in a log stored in the RAM 20. If the stage is completed successfully a message is sent again identifying the stage and announcing its successful completion. If the stage is unsuccessful a message is sent containing information concerning the error, as well as the identification. These messages, too, are displayed and logged.

If a stage is not completed successfully the system will retry it, and if it is now successful a message will be sent to that effect. If not, attempts will be made to determine the nature of the error more specifically and the results will also be transmitted by a message. If the error is found to be non-critical processing will continue; if it is critical, processing will halt and the log in the RAM 20 may be read out to allow the course of the loading sequence to be examined. And the diagnostic unit 2 may be operated to cause the contents of the registers 32 and 38 and control store 25 to be read out for examination. It will be seen that the main processor system 1 has been able to pass information it has determined to the diagnostic unit 2 and from there to the operator's unit 3. The diagnostic system has been kept informed of the progress of events in the main system 1 while processing continues.

Among the possible variants on the system described, it can be arranged for the central processor 5 to use more than one location for the messages to be output to the diagnostic system. The messages may then be longer. For example, the location following the location 44 may also be used. In that case, following detection of a write to the location 44 and the reading of its contents by the diagnostic unit, the address output register 63 is incremented by 1, and the control store 5 is read using this address. There is no need to alter the address comparator circuit 74 which remains ready for the next write to the original location 44.

It will be realized that while the system described uses a microprocessor system which receives an interrupt when address equivalence is detected and subsequently reads the output location in the control store, it would be possible instead to use hardware logic elements in the interface unit 14 which, in response to the signal on the line 60, cause the desired read to take place.

Because of the flexibility of the diagnostic processor described, messages may equally be passed from the diagnostic processor to the central processor 5 being written by the interface unit into a dedicated location or sequence of locations in the control store.

We claim:

1. A data processing system comprising: a main processor system including a central processor having a writable control store, the operation of the central processor being controlled by a microprogram held in the control store; and diagnostic apparatus connected to receive signals indicative of occurrences in the central processor, the diagnostic apparatus comprising:
    (a) first means coupled to the central processor for producing a first signal whenever the central processor accesses a predetermined location in the control store;
    (b) second means coupled to the central processor for producing a second signal whenever the central processor writes to the control store;
    (c) logic means responsive to the first and second signals for producing an output signal whenever both the first and second signals are present, indicating that the central processor has made a write access to said predetermined location; and
    (d) means coupled to the control store and responsive to said output signal for reading out information held in said predetermined location and transferring the information to the diagnostic apparatus.

2. A system according to claim 1 wherein said first means comprises:
    (a) register means settable to hold an indication of the address of said predetermined location;
    (b) means for supplying an indication of the address used in each control store access; and
    (c) comparator means connected to receive the two said indications and to produce said first signal on detecting equivalence between them.

3. A system according to claim 1 wherein the means for reading out and transferring the information held in said predetermined location comprises means for issuing a halt signal to the central processor effective to halt execution of said microprogram.

4. A system as claimed in claim 1, in which the diagnostic apparatus includes a microprocessor connected to receive the said output signal as an interrupt signal and to supply signals for causing the operation of the said means for reading out and transferring the information held in said predetermined location of the control store to be initiated.

5. A process for passing information from a central processor in a main processor system to diagnostic apparatus coupled to the central processor to receive signals indicative of occurrences in the central processor, the central processor having a writable control store holding a microprogram for execution by the central processor, the process comprising the steps:

(a) operating the central processor to select diagnostic information and to write that information into a predetermined location of the control store;

(b) operating the diagnostic apparatus to detect access to said predetermined location and to determine whether that access is a write access; and (c) supplying signals from the diagnostic apparatus, upon defection of the write access to said predetermined location;

(d) causing said information to be read out from the control store and transferred to the diagnostic apparatus.

6. A process as claimed in claim 5, in which the step of causing the said information to be read out of the control store and transferred to the diagnostic apparatus comprises issuing a halt signal from the diagnostic apparatus to the central processor, and supplying the address of the said predetermined location from the diagnostic apparatus as a read address for the control store.

7. A process as claimed in claim 5 in which information selected by the central processor is written to at least one other location in addition to the said predetermined location, and the diagnostic processor supplies signals causing the information held in all those locations to be read out and transferred to itself in response to the detection of a write access to solely the said predetermined location.

* * * * *